United States Patent [19]
Powell

[11] Patent Number: 6,030,290
[45] Date of Patent: Feb. 29, 2000

[54] MOMENTARY CONTACT MOTION SWITCH FOR VIDEO GAMES

[76] Inventor: Donald E Powell, P.O. Box 2612, Wailuku, Hi. 96793

[21] Appl. No.: 08/880,520

[22] Filed: Jun. 24, 1997

[51] Int. Cl.[7] ..................................................... A63F 9/24
[52] U.S. Cl. .................. 463/36; 273/148 B; 200/DIG. 2
[58] Field of Search ................................ 463/36, 37, 38, 463/39; 273/148 B; 200/DIG. 2, DIG. 9, DIG. 23

[56] References Cited

U.S. PATENT DOCUMENTS

| | | |
|---|---|---|
| 3,700,836 | 10/1972 | Rackson . |
| 4,613,139 | 9/1986 | Robinson, II . |
| 4,925,189 | 5/1990 | Braeunig ............................ 273/148 B |
| 5,045,650 | 9/1991 | Suzulsi ............................... 200/DIG. 2 |
| 5,139,261 | 8/1992 | Opiniano ........................... 273/148 B |
| 5,212,372 | 5/1993 | Quick et al. . |
| 5,228,078 | 7/1993 | Capper et al. .................... 273/148 B |
| 5,229,756 | 7/1993 | Kosugi et al. ........................... 463/36 |
| 5,414,256 | 5/1995 | Gurnee et al. .......................... 463/36 |
| 5,488,362 | 1/1996 | Ullman et al. . |
| 5,516,105 | 5/1996 | Eisenbuy et al. ................. 273/148 B |
| 5,568,928 | 10/1996 | Munson et al. ......................... 463/37 |
| 5,616,078 | 4/1997 | Oh .............................................. 463/8 |
| 5,649,861 | 7/1997 | Okano et al. ........................... 463/36 |
| 5,741,182 | 4/1998 | Lipps et al. ............................ 463/36 |

*Primary Examiner*—Michael O'Neill
*Attorney, Agent, or Firm*—Michael I. Kroll

[57] ABSTRACT

A momentary contact motion switch (12) comprising a structure (14) for attaching the momentary contact motion switch (12) to a limb (16) of a person (18). A facility (20) is for connecting the momentary contact motion switch (12) to a video game unit (22), which is coupled to a television monitor (24). When the person (18) move their limb (16) and activates the momentary contact motion switch (12) a martial arts fighter (26) in a martial arts video game (27) will move a matching limb (28), that will be displayed on the television monitor (24).

3 Claims, 4 Drawing Sheets

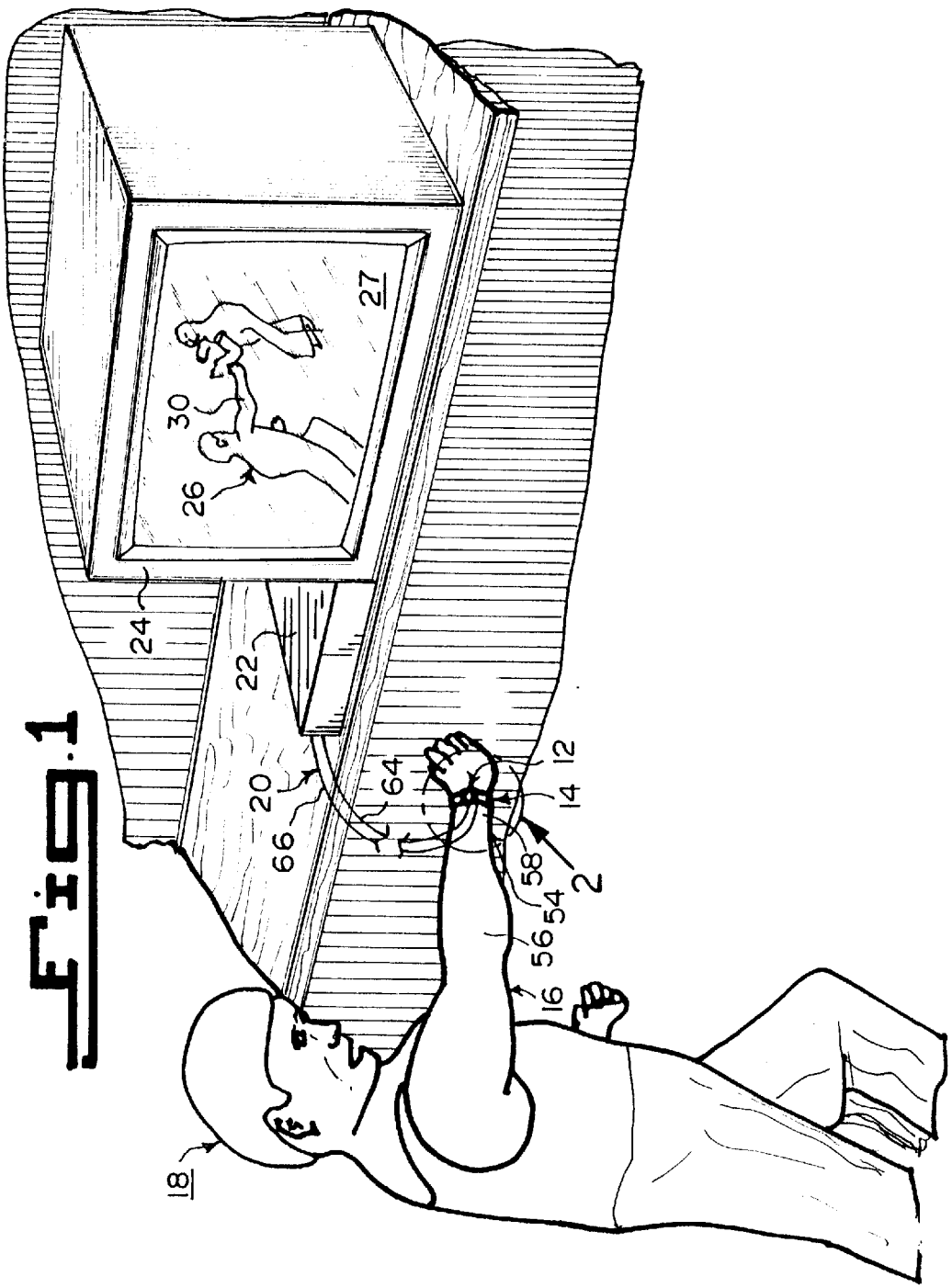

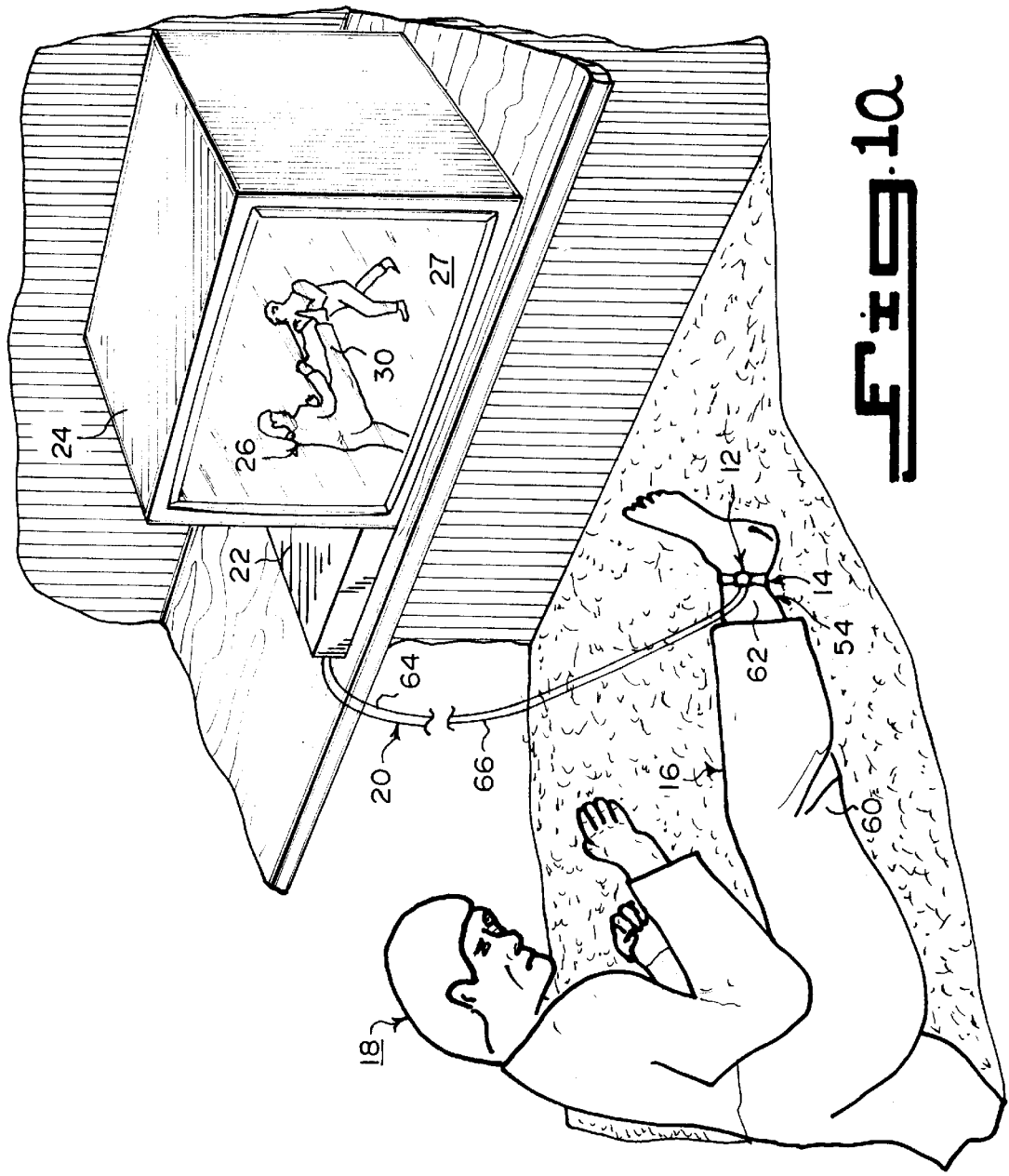

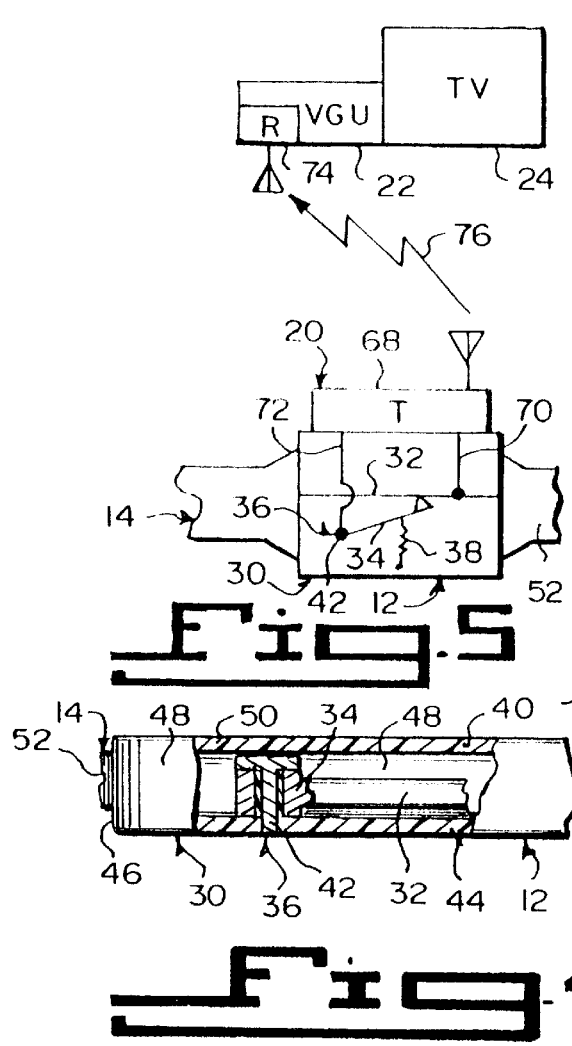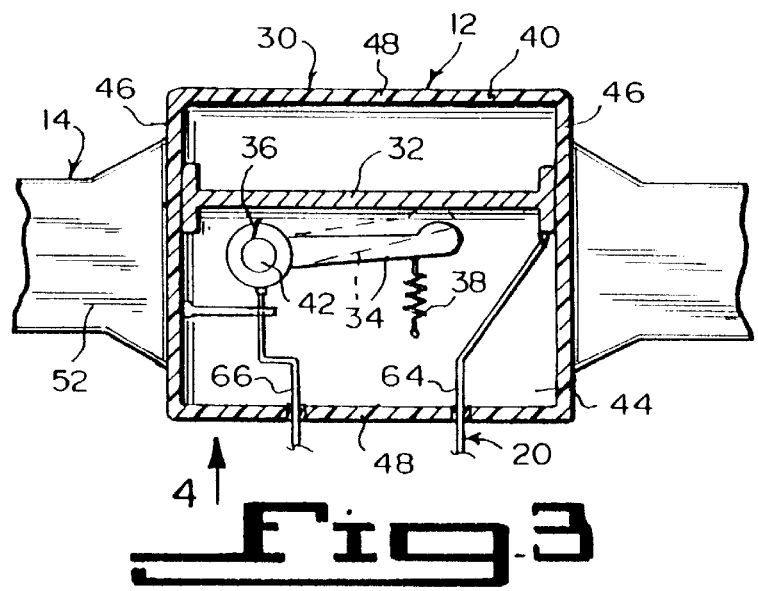

MOMENTARY CONTACT MOTION SWITCH FOR VIDEO GAMES

BACKGROUND OF THE INVENTION

1. Field of the Invention

The instant invention relates generally to hand control apparatuses and more specifically it relates to a momentary contact motion switch. The momentary contact motion switch can be strapped to the wrist or ankle of a person, to operate a martial arts video game when the person punches or kicks.

2. Description of the Prior Art

Numerous hand control apparatuses have been provided in prior art. For example, U.S. Pat. No. 3,700,836 to Rackson; U.S. Pat. No. 4,613,139 to Robinson II; U.S. Pat. No. 5,212,372 to Quick et al.; and U.S. Pat. No. 5,488,362 to Ullman et al. all are illustrative of such prior art. While these units may be suitable for the particular purpose to which they address, they would not be as suitable for the purposes of the present invention as heretofore described.

RACKSON, CHESTER R.

HAND HELD FINGER CONTROLLED SWITCH DEVICE WITH FLEXIBLE WRIST STRAP MOUNT

U.S. Pat. No. 3,700,836

A control device for apparatus is adapted for support on the fourth finger of an operator's hand, has a housing of contoured shape to fit in the palm of the hand. A loop extends outwardly of one end of the housing for receiving and encircling the base of the fourth finger. Switches or other control units in the housing have operating members extending upwardly of the housing for operation by third and fourth fingers. The holder is connected to the housing integrally or separably. The holder may include a wrist band and strap integrally or separably connected together. Barb and loop fastener members may adjustable connect the strap and housing. Loop members to engage the back of the hand can be integral with the strap or with the housing. The holder can have a fingerless glove-like form with integral wrist band, strap and back portion.

ROBINSON, II, WILLIAM H.

VIDEO CONTROL GLOVES

U.S. Pat. No. 4,613,139

Apparatus for providing switch closure control inputs to a joy stick control port of a video console, comprising a pair of gloves having separate finger and thumb portions with electrical contacts mounted on the palm surfaces thereof adjacent to the finger and thumb tips. The electrical contacts are connected to selected terminals of a connector adapter for removable insertion into the console control port. Physical contact between the finger and thumb tips obtains electrical connection between associated contacts, so as to provide switch closure control inputs to associated terminals of the control port.

QUICK, DUSTY L.

ESTMAN, JAY M.

BOLES, JOHN A.

PORTABLE TRANSACTION TERMINAL FOR OPTICAL AND KEY ENTRY OF DATA WITHOUT KEYBOARDS AND MANUALLY ACTUATED SCANNERS

U.S. Pat. No. 5,212,372

To increase the efficiency of personnel conducting inventory management operations, including data entry of products and information as to their absence, presence or location, the operator is provided with a glove having finger sheaths and a portion for the posterior or dorsal surface of the hand which covers that surface. A bar code reader is located in a housing on the cover and flexural strain gauge elements are located in the sheaths in the vicinity of the joints of the fingers. Signals form these elements are digitized and provide for manual data entry and also for commands to operate the bar code reader. The glove and the sensors constitute a portable transaction or data entry terminal which does not require manual actuation of a trigger to operate the bar code scanner or a keyboard for manual entry of data concerning the products to be managed. Electronics for processing signals from the sensors, for operating a display to indicate the data entered upon selective movement of the fingers between flexion and extension and from the bar code reading operations, are all contained in a housing which also contains the bar code reader.

ULLMAN, NOAH T.

ULLMAN, ADAM N.

APPARATUS FOR CONTROLLING A VIDEO GAME

U.S. Pat. No. 5,488,362

A hand attachment is lined above and below a wrist portion with parallel conductive contacts. One set of contacts is connected to a signal generator which generates control signals for moving characters in a video game. The second set of contacts is connected to the video game. Placing the hand at an angle selectively connects the contacts, sending the desired direction control signal to the video game. Conductive contacts are also located on the thumb and fingertips. Placing the thumb in contact with any of the fingertips connects a static signal generator to the video game. The hand attachment may be a glove or a wrist cuff. The control signals generated by the hand attachment may be wirelessly transmitted to the video game.

SUMMARY OF THE INVENTION

A primary object of the present invention is to provide a momentary contact motion switch that will overcome the shortcomings of the prior art devices.

Another object is to provide a momentary contact motion switch that can be strapped to a wrist or ankle of a person which will close an electric circuit when moved in a specific manner, so as to operate the martial arts video game when the person punches or kicks.

An additional object is to provide a momentary contact motion switch in which the switch can be connected to the video game unit by wires in a first version, or can be connected to the video game unit by radio or infrared transmission in a second version that is wireless.

A further object is to provide a momentary contact motion switch that is simple and easy to use.

A still further object is to provide a momentary contact motion switch that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 1 is a perspective view of a first embodiment of the instant invention strapped to a wrist of a person in use with a video game.

FIG. 1a is a perspective view of the first embodiment strapped to an ankle of a person in use with a video game.

FIG. 3 is a cross sectional view taken along line 3—3 in FIG. 2.

FIG. 4 is an end view taken in the direction of arrow 4 in FIG. 3, with parts broken away and in section.

FIG. 5 is a diagrammatic top view showing a second embodiment of the instant invention being a wireless version.

Similar reference characters denote corresponding features consistently throughout the attached drawings.

DETAILED DESCRIPTION OF THE PREFERRED EMBODIMENTS

Figure 2:
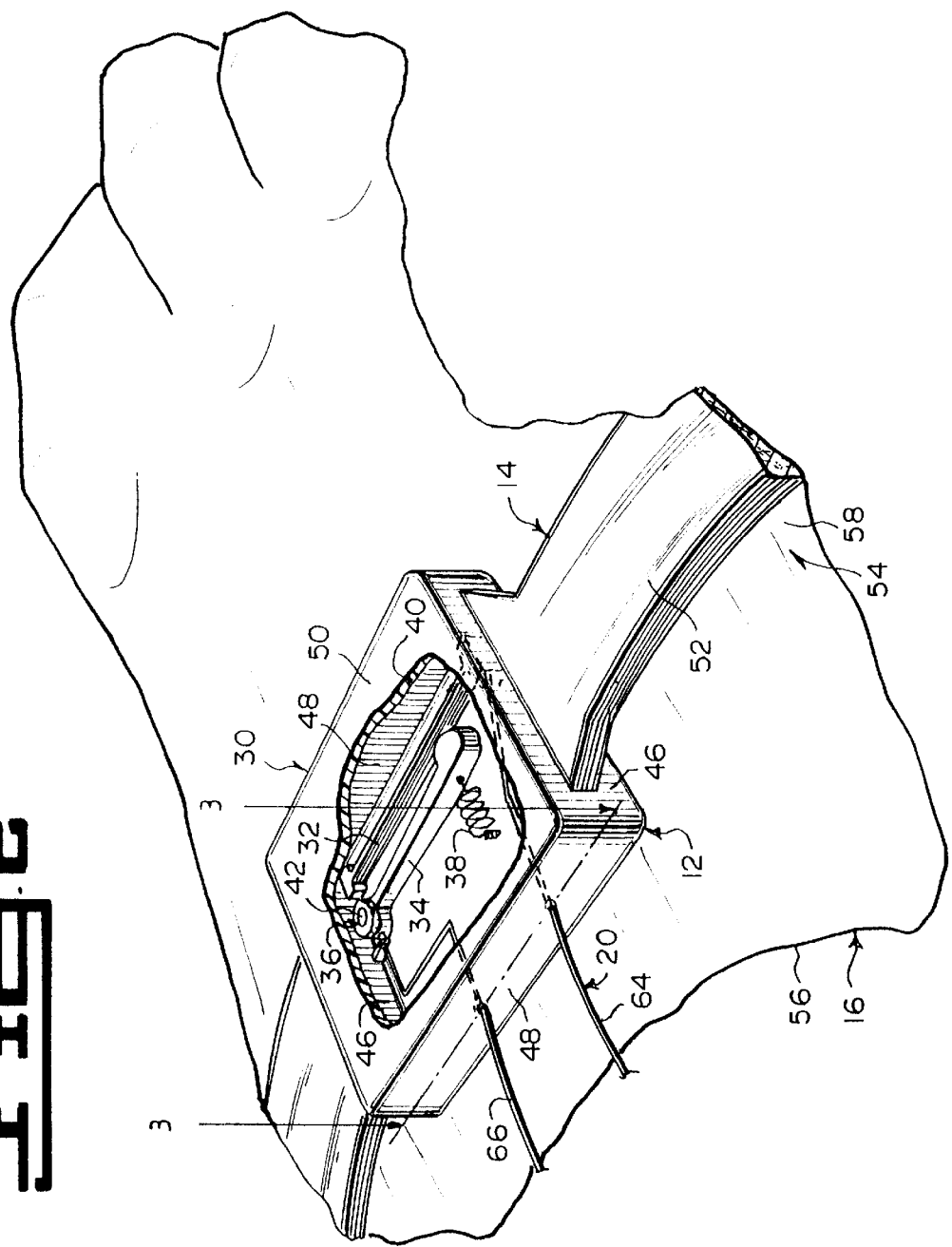
FIG. 2 is an enlarged perspective view of the area in FIG. 1 as indicated by arrow 2, with parts broken away and in section.

Turning now descriptively to the drawings, in which similar reference characters denote similar elements throughout the several views, FIGS. 1 to 5 illustrate a momentary contact motion switch 12. A structure 14 is for attaching the momentary contact motion switch 12 to a limb 16 of a person 18. A facility 20 is for connecting the momentary contact motion switch 12 to a video game unit 22, which is coupled to a television monitor 24. When the person 18 moves their limb 16 and activates the momentary contact motion switch 12, a martial arts fighter 26 in a martial arts video game 27 will move a matching limb 28, that will be displayed on the television monitor 24.

The momentary contact motion switch 12 includes an enclosure 30. A stationary contact arm 32 is mounted within the enclosure 30. A movable contact arm 34 is provided. A component 36 is for pivotally affixing the movable contact arm 34 within the enclosure 30. The movable contact arm 34 will engage with the stationary contact arm 32 to close the momentary contact motion switch 12, when the limb 16 of the person 18 is thrust forward and stops.

A spring 38 is connected between the enclosure 30 and the movable contact arm 34. The spring 38 will return the movable contact arm 34 back to its original position, to open the momentary contact motion switch 12.

The enclosure 30 is fabricated out of a non-conductive material 40, to insulate the stationary contact arm 32 from the movable contact arm 34. The pivotally affixing component 36 is a pivot pin 42 that extends through one end of the movable contact arm 34 and into the enclosure 30.

The enclosure 30 consists of a bottom wall 44. A pair of side walls 46 extend upwardly from the bottom wall 44. A pair of end walls 48 extend upwardly from the bottom wall 44. A top wall 50 extends over the side walls 46 and the end walls 48.

The attaching structure 14 is a band 52 on the enclosure 30, that extends about a region 54 on the limb 16 of the person 18. The band 52 is sized to snugly retain the momentary contact motion switch 12 against the region 54 of the limb 16 of the person 18. As shown in FIGS. 1 and 2, the limb 16 is an arm 56, while the region 54 is a wrist 58, so that the person 18 can simulate a punch. In FIG. 1a, the limb 16 is a leg 60, while the region 54 is an ankle 62, so that the person 18 can simulate a kick.

In FIGS. 1 to 3, the connecting facility 20 comprises a first elongate wire 64 extending from the stationary contact arm 32 out through the enclosure 30 to a first joy stick control port (not shown) on the video game unit 22. A second elongate wire 66 extends from the movable contact arm 34 out through the enclosure 30 to a second joy stick control port (not shown) on the video game unit 22.

The connecting facility 20 in FIG. 5, consists of a radio or infrared transmitter 68 on the enclosure 30. A first wire 70 extends from the stationary contact arm 32 to the radio or infrared transmitter 68. A second wire 72 extends from the movable contact arm 34 to the radio or infrared transmitter 68. A radio or infrared receiver 74 is in the video game unit 22 to receive a radio or infrared signal 76 from the radio or infrared transmitter 68, when the momentary contact motion switch 12 goes into a closed position.

OPERATION OF THE INVENTION

To use the momentary contact motion switch 12 as shown in FIG. 1, the following steps should be taken:

1. Place the band 52 about the wrist 58 on the arm 56 of the person 18.
2. Plug the first and second elongate wires 64 and 66 into the first and second joy stick control ports on the video game unit 22.
3. Allow the person 18 to simulate a punch to close the momentary contact motion switch 12, so that the martial arts fighter 26 in the martial arts video game 27 will move a matching limb 28 being an arm, which will be displayed on the television monitor 24.

To use the momentary contact motion switch 12, as shown in FIG. 1a, the following steps should be taken:

1. Place the band 52 about the ankle 62 on the leg 60 of the person 18.
2. Plug the first and second elongate wires 64 and 66 into the first and second joy stick control ports on the video game unit 22.
3. Allow the person 18 to simulate a kick to close the momentary contact motion switch 12, so that the martial arts fighter 26 in the martial arts video game 27 will move a matching limb 28 being a leg, which will be displayed on the television monitor 24.

To use the momentary contact motion switch 12 for the arm 56 of the person 18, as shown in FIG. 5, the following steps should be taken:

1. Place the band 52 about the wrist 58 on the arm 56 of the person 18.
2. Allow the person 18 to simulate a punch to close the momentary contact motion switch 12, which will cause the radio or infrared transmitter 68 to send the radio or infrared signal 76 to the radio or infrared receiver 74 in the video game unit 22, so that the martial arts fighter 26 in the martial arts video game 27 will move a matching limb 28 being an arm, which will be displayed on the television monitor 24.

To use the momentary contact motion switch 12 for the leg 60 of the person 18, as shown in FIG. 5, the following steps should be taken:

1. Place the band 52 about the ankle 62 on the leg 60 of the person 18.
2. Allow the person 18 to simulate a kick to close the momentary contact motion switch 12, which will cause the radio or infrared transmitter 68 to send the radio or infrared signal 76 to the radio or infrared receiver 74 in the video game unit 22, so that the martial arts fighter 26 in the martial arts video game 27 will move a matching limb 28 being a leg, which will be displayed on the television monitor 24.

| LIST OF REFERENCE NUMBERS | |
|---|---|
| 12 | momentary contact motion switch |
| 14 | attaching structure of 12 |
| 16 | limb of 18 |
| 18 | person |
| 20 | connecting facility of 12 |
| 22 | videogame unit |
| 24 | television monitor |
| 26 | martial arts fighter in 28 |
| 27 | martial arts video game |
| 28 | matching limb of 26 |
| 30 | enciosure of 12 |
| 32 | stationary contact arm of 12 |
| 34 | movabie contact arm of 12 |
| 36 | pivotally affixing component of 12 |
| 38 | spring of 12 |
| 40 | non-conductive material of 12 |
| 42 | pivot pin for 36 |
| 44 | bottomn wall of 30 |
| 46 | side wall of 30 |
| 48 | end wall of 30 |
| 50 | top wall of 30 |
| 52 | band of 14 |
| 54 | region of 16 |
| 56 | arm for 16 |
| 58 | wrist for 54 |
| 60 | leg for 16 |
| 62 | ankle for 54 |
| 64 | first elongate wire of 20 between 22 and 32 |
| 66 | second elongate wire of 20 between 22 and 34 |
| 68 | radio or infrared transmitter of 20 on 30 |
| 70 | first wire of 20 between 32 and 68 |
| 72 | second wire of 20 between 34 and 68 |
| 74 | radio or infrared receiver of 20 in 22 |
| 76 | radio or infrared signal between 68 and 74 |

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A momentary contact motion switch for use with a video game unit comprising:

a) means for attaching said momentary contact motion switch to a limb of a person;

b) means for connecting said momentary contact motion switch to a video game unit which is coupled to a television monitor, so when the person moves a limb and activates said momentary contact motion switch a martial arts fighter in a martial arts video game will move a matching limb, that will be displayed on the television monitor;

c) said momentary contact motion switch having means to record certain motions of said limb comprising a rectangular enclosure, a stationary contact arm mounted within said enclosure extending substantially the full interior width of said enclosure, an elongated movable contact arm pivoted about a pin at one end extending substantially parallel to said stationary contact arm in the resting position of said movable arm, and a coiled spring attached between a free end of said movable contact arm and said enclosure such that said movable contact arm will move from its resting position to elongate said spring to engage said stationary contact arm to close said momentary contact motion switch when the limb of the person is thrust forward and stops, said elongated contact arm returning to its resting position after the motion of said limb stops; and d) said attaching means being a band on said enclosure that extends around a limb of the person to secure said enclosure to said limb, said limb being a wrist in one instance to simulate a punch and said limb being an ankle in another instance to simulate a kick, said kick or punch being displayed on said television monitor.

2. A momentary contact motion switch as recited in claim 1, wherein said connecting means includes:

a) a first elongate wire extending from said stationary contact arm out through said enclosure to a first joy stick control port on the video game unit; and b) a second elongate wire extending from said movable contact arm out through said enclosure to a second joy stick control port on the video game unit.

3. A momentary contact motion switch as recited in claim 1, wherein said connecting means includes:

a) a radio/infrared transmitter on said enclosure;

b) a first wire extending from said stationary contact arm to said radio/infrared transmitter;

c) a second wire extending from said movable contact arm to said radio/infrared transmitter; and d) a radio/infrared receiver in the video game unit to receive a radio/infrared signal from said radio/infrared transmitter, when said momentary contact motion switch goes into a closed position.

* * * * *